Patented June 18, 1935

2,005,538

UNITED STATES PATENT OFFICE 2,005,538

ALKOXY-PHENYL-IMIDAZOLES

Max Engelmann, Wilmington, Del., assignor to E. I. du Pont de Nemours & Company, Wilmington, Del., a corporation of Delaware No Drawing. Application August 27, 1932, Serial No. 630,699

9 Claims. (Cl. 260—44)

This invention relates to carbon compounds, specifically imidazoles and more particularly to substituted-phenyl-imidazoles.

This invention has for an object the preparation of alkoxy-phenyl-imidazoles, of the general formula

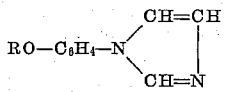

where R stands for an alkyl radical. I have found that compounds of this type possess the valuable property of producing local anesthesia in animal tissue, and are therefore useful in the therapeutic arts.

I prepare my novel compounds by reacting alkoxy-phenyl-isothiocyanates with amino-acetal (also called beta-beta-diethoxy-ethylamine) to produce alkoxy-phenyl-acetalyl-thioureas, the treatment of such thioureas with acids to produce mercapto-imidazoles and the oxidation of the resultant products to produce alkoxy phenyl-imidazoles. The reactions taking place in this synthesis are probably indicated by the following equation:

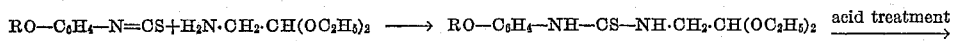
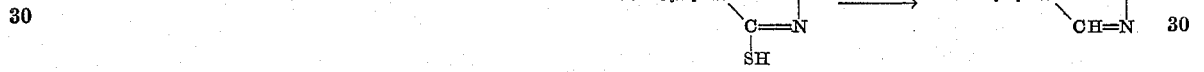

The invention will be further understood from a consideration of the following detailed description and the specific examples in which the parts are given by weight.

Example I

Thirty-three (33) parts of para-methoxy-phenyl mustard oil (organic isothiocyanates are commonly referred to as mustard oils) were mixed with 28 parts of amino-acetal. Moderate heat was generated and after cooling the mixture solidified. Presumably para-methoxy-phenyl-acetalyl thiourea was formed. This thiourea, which had a melting point of 81° C. was boiled under a reflux condenser for 30 minutes with 250 parts of 30% sulphuric acid. The product went into solution but soon afterwards the separation of the mercapto-derivatives started. This precipitated product was separated from the reaction body and after recrystallization from ethyl alcohol was found to melt at 216–217° C. Twenty (20) parts of this compound (1-methoxy-phenyl-2-mercapto-imidazole) were mixed with 75 parts of 20% nitric acid and slowly heated on a water bath. A violent reaction took place and the product went into solution with the formation of the nitric acid salt of 1-methoxy-phenyl-imidazole. After filtration the solution was cooled down causing the nitrate to crystallize out. It was separated and found to have a melting point of 133–134° C. The free base was obtained by neutralizing the solution of the nitrate with ammonia water. It separated out as an oil which was very soluble in organic solvents for example ethyl alcohol, benzene and acetone.

This final product, namely, 1-para-methoxy-phenyl-imidazole, forms stable salts with acids. It probably has the following formula:

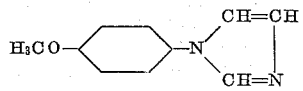

Example II

Thirty-six (36) parts of para-ethoxy-phenyl-isothiocyanate were condensed with 28 parts of amino-acetal to produce N-para-ethoxy-phenyl-acetalyl-thiourea in a manner similar to that described in Example I. The melting point of this thiourea was found to be 66–67° C. Treatment with about five times its volume of 50% sulphuric acid caused the thiourea to be converted to 1-para-ethoxy-phenyl-2-mercapto-imidazole having a melting point of 205° C. Upon oxidation this product was converted into 1-para-ethoxy-phenyl-imidazole. The nitric salt (that is the nitrate) of this base melts at 135° C. The free base, obtained by neutralizing a water solution of a nitrate with sodium carbonate, after purification by recrystallization from benzene, was found to have a melting point of 50° C. The acid salts of this imidazole derivative are soluble in water and alcohol. They are insoluble in diethyl-ether. The details of the preparation of this 1-para-ethoxy-phenyl-imidazole are very similar to those set out for the preparation of the imidazole in Example I. The product formed probably has the following formula:

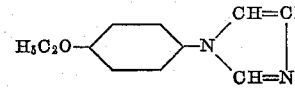

Because of complications in preparation it is preferred to use amino-acetal in the invention herein described rather than the other di-alkoxy derivatives, for example, beta-beta-di-methoxy-ethyl-amine. Considerable difficulty is encountered in the preparation of compounds involving alkoxy groups other than the ethoxy.

The invention is not limited to the oxidation of the mercapto-imidazole with nitric acid. Other oxidizing agents may be utilized.

In closing the imidazole ring, according to the specific examples, sulphuric acid has been used. The invention is not limited to this particular substance since other materials for example hydrochloric acid and phosphoric acid accomplish a similar result.

In a similar manner other alkoxy derivatives of phenyl-imidazole may be prepared, for instance, propyloxy, isopropyloxy, butyloxy, iso-butyloxy, amyloxy, etc.

The compounds produced according to this invention readily form acid salts, for example, the hydrohalide salts, particularly the hydrochloride and the hydrobromide, the oxalate, the formate, the nitrate, the chloracetate, the disulphate (imidazole$_2 \cdot$H$_2$SO$_4$) the picrate and the diphosphate (imidazole$_2 \cdot$H$_3$PO$_4$).

These products are stable bodies of basic character and have valuable local anesthetic properties.

As many apparently widely different embodiments of this invention may be made without departing from the spirit and scope thereof, it is to be understood that I do not limit myself to the specific embodiments thereof except as defined in the appended claims.

I claim:

1. The product 1-para-ethoxy-phenyl-imidazole which is soluble in ethyl alcohol, di-ethyl ether and acids and which is substantially insoluble in water and which melts at 50° C., and which may be prepared by reacting amino-acetal with para-ethoxy-phenyl-isothiocyanate, heating the resultant product and oxidizing the last product and whose nitrate melts at 135° C.

2. Alkoxy-phenyl-imidazoles.

3. A compound which in the form of free base corresponds to the general formula

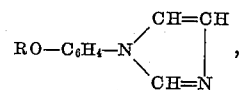

wherein R stands for an alkyl radical having not over 5 carbon atoms.

4. 1-para-methoxy-phenyl-imidazole.

5. A process for producing an alkoxy-phenyl-imidazole which comprises oxidizing the corresponding alkoxy-phenyl-imidazole-mercaptan.

6. A process for producing an alkoxy-phenyl-imidazole which comprises ring closing by the aid of acid an alkoxy-phenyl-acetalyl-thiourea, and oxidizing the resulting alkoxy-phenyl-imidazole-mercaptan, whereby to remove the sulfur atom.

7. A process for producing an alkoxy-phenyl-imidazole which comprises reacting an alkoxy-phenyl-isothiocyanate with amino-acetal, ring closing the resulting thiourea by the aid of acid, and oxidizing the resulting alkoxy-phenyl-imidazole-mercaptan, whereby to remove the sulfur atom.

8. In the process of producing an alkoxy-phenyl-imidazole, the step which comprises reacting with dilute nitric acid upon an alkoxy-phenyl-imidazole-mercaptan, whereby to eliminate the sulfur atom.

9. A process for producing an alkoxy-phenyl-imidazole which comprises boiling an alkoxy-phenyl-acetalyl-thiourea with aqueous sulfuric acid to form a 1-alkoxy-phenyl-2-mercapto-imidazole, heating the latter with aqueous nitric acid whereby to oxidize the sulfur atom and form the nitric acid salt of the corresponding alkoxy-phenyl-imidazole, and reacting upon the latter with alkali to liberate the free base.

MAX ENGELMANN.